Nov. 27, 1934.   B. C. PLACE   1,982,232
SECURING FASTENERS TO UPHOLSTERED TRIM PANELS
Filed Feb. 8, 1932
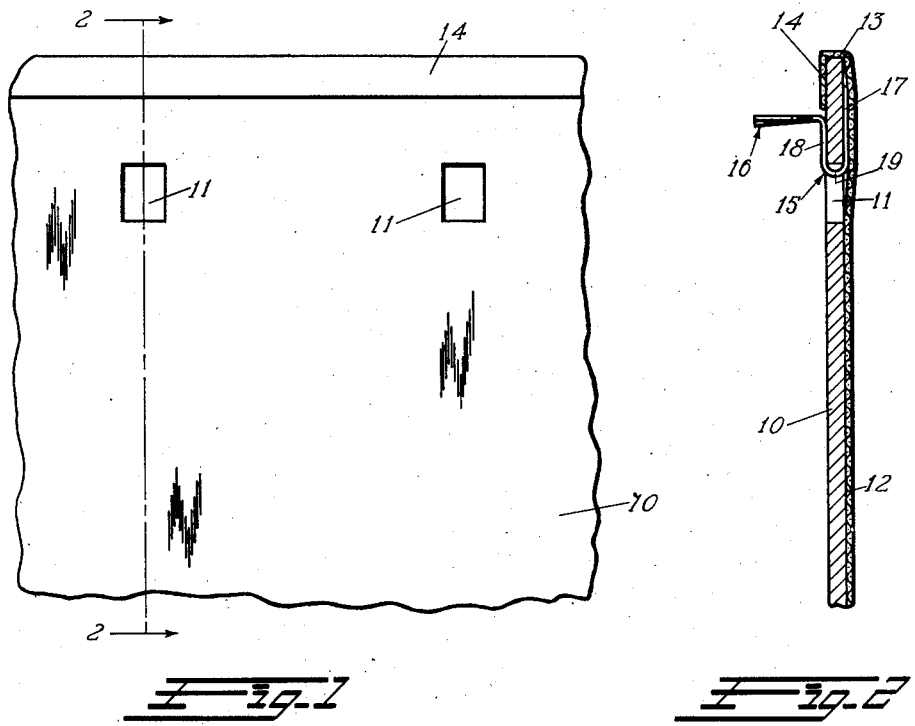
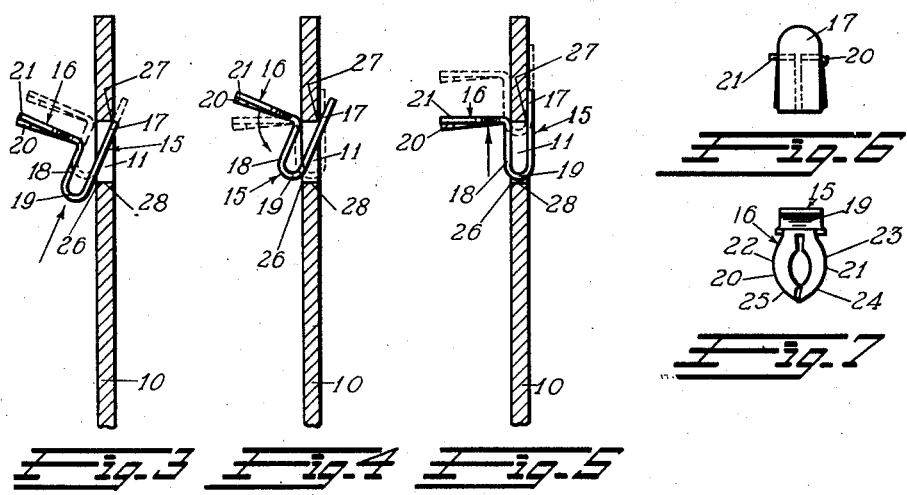
Inventor
Bion C. Place
By
Strauch & Hoffman
Attorneys

Patented Nov. 27, 1934

1,982,232

UNITED STATES PATENT OFFICE 1,982,232

SECURING FASTENERS TO UPHOLSTERED TRIM PANELS

Bion C. Place, Detroit, Mich., assignor of one-half to George E. Gagnier, Detroit, Mich.

Application February 8, 1932, Serial No. 591,744

2 Claims. (Cl. 45—138)

This invention relates to a method of securing snap fasteners to upholstered trim panels for use in finishing the interior of automobile or similar bodies.

More particularly the invention relates to a novel method of assembling snap fasteners of the hook-on type, having a head in the form of a hook including two arms one of which is substantially longer than the other, with respect to a trim panel provided with an opening of a size that is insufficient to permit the passage of the longer arm of the fastener directly therethrough by a movement along the axis of the shank of the fastener.

Trim panels for automobile bodies or the like are now frequently applied to the supporting structure of the body by first assembling snap fasteners with respect to the covered panels from the rear or uncovered face thereof, and by then subsequently snapping the shanks of the fasteners into suitable openings or sockets in the supporting structure. One fastener used for this purpose includes a head in the form of a hook arranged so that it may grip the portion of the foundation of the panel adjacent an opening in the panel to thereby hold the fasteners in assembled or interlocked relation with respect to the panel before the application of the panel to the supporting structure. In using fasteners of this type, it is the practice to apply fasteners at intervals along the margin of the panels before applying the panel to the supporting structure, and inasmuch as each panel includes a relatively large number of fasteners, it is essential that the openings in the panels to which the fasteners are applied and the structure of the fastener be designed with particular regard to the mode of assembly of the fasteners with respect to the panel to the end that the fasteners may be hooked on the panel with facility and with the minimum expenditure of time.

In order that the fasteners may remain firmly hooked on the material after application thereto, it is essential that the spacing between the arms of the hook-heads be such that the foundation of the panel is firmly gripped between said arms after the fasteners have been applied thereto. When this arrangement of the arms is provided, it has been found that it is not practical to readily apply fasteners by any mode of procedure that involves final movement of the hook-head in a direction other than substantially along the length of the arms of the hook. The application of fasteners in this way is possible if sufficiently large openings are formed in the foundation of the panel, but the formation of such openings is undesirable because of the weakening effect upon the panel, because when the fastener is inserted by a straight line movement through large openings the operator, in applying the fasteners, experiences difficulty in bringing the hook into immediate engagement with an edge of the foundation surrounding the opening therein; and finally because the fasteners can freely drop through said openings if for any reason, the hook-heads do not grip the foundation.

The primary object of this invention is to provide a simple and practical mode of assembling hook-on fasteners with respect to trim panels provided with fastener receiving openings of a minimum size, or a size less than that which would permit the head of the fastener to be passed freely therethrough by a straight line movement in the direction of the length of the shank of the fastener and that will enable the operators to apply the fasteners with expedition and with a minimum expenditure of effort.

Another object of the invention is to provide a method of assembling hook-on fasteners with respect to trim panels whereby openings substantially smaller than the heads of the fasteners may be utilized, which will permit the passage of portions of said head through the foundation of the panels from the rear or uncovered face thereof and that permits the assembly of the fasteners and panel to be very readily brought about in spite of the limited nature of the openings in the panels through which the fasteners are passed.

A still further object of the invention is to provide a novel method of assembling snap fasteners having heads in the form of hooks, one arm of the hook being substantially longer than the other, in which use is made of the long arm of the fastener to guide the hook into proper assembled relation with respect to the panel.

Still further objects of the invention will appear as this description proceeds with reference to the accompanying drawing in which:

Figure 1 is a fragmentary rear view of a portion of an automobile trim panel provided with openings of one form permitting the passage of a portion of the head of a fastener of hook-like form into interlocking engagement with the panel.

Figure 2 is a sectional view taken on the plane indicated by the line 2—2 in Figure 1, a fastener being shown in final position.

Figure 3 is a sectional view showing the initial position of a fastener in assembling it with respect to the panel in full lines, and the position of the fastener after the conclusion of the first step of its assembly, with respect to the panel, in dotted lines.

Figure 4 is a fragmentary sectional view showing the position of the fastener in full lines at the beginning of the second step of the assembly operation, and showing the position of the fastener in dotted lines at the completion of the second step in the assembly operation.

Figure 5 is a fragmentary sectional view showing the position of the fastener in full lines at the beginning of the third step of the assembly operation, and in dotted lines showing the position of said fastener after it has reached its final position in interlocking engagement with respect to the foundation of the panel.

Figures 6 and 7 are respectively plan and elevational views of one form of a hook-headed snap fastener of the type to which this invention pertains.

Like reference characters indicate like parts throughout the several figures.

The numeral 10 designates the foundation or the body of the trim panel. Such foundation is constructed of stiff card board or like material of the desired thickness following the usual practice of the art. The foundation 10 is provided with a multiplicity of openings 11 arranged at spaced intervals around some or all of the margins of the foundation for the reception of portions of the heads of the snap fasteners that are assembled with respect to the foundation after the trim panel has been completely manufactured. The openings 11 may assume any form, that is, they may be rectangular as shown, oval or round, as may be desired. Said openings are made of a size sufficient to just permit the free assembly of the fasteners with respect to the foundation without binding, in the manner hereinafter described, and are of insufficient size to permit the head of the fastener to be passed therethrough by a movement of the fastener in a direction of the length of the shank thereof, which ordinarily projects away from said head substantially at right angles. By thus limiting the size of the openings it will be understood that the weakening of the foundation by the formation of large openings is avoided and at the same time the openings are of such size that when the fastener has been assembled with respect thereto, it cannot readily drop out of the opening even though the arms constituting the hook of the head do not firmly grip the material, though it is preferred that the arms do grip said material firmly. However, if for any reason, such as distortion of the head of the fastener, the hook does not firmly grip the foundation and slips out of its intended position, the portion of the hook that connects the arms thereof will contact with a wall of the opening before the longer arm may become disengaged from the panel. Such contact with said wall prevents further sliding movement of said fastener, which thus retains its approximate position until the operator in applying the panel to the supporting structure can readjust the fastener prior to the entry of the shank thereof in the opening or socket of the supporting structure that is provided to receive it.

After the foundation 10 is provided with openings having the characteristics just stated, the front face thereof is covered by the application of a suitable upholstery material 12 of any suitable fabric completely covering one side of the foundation 10, concealing the openings 11 therein and lapping the exposed edges 13 of the foundation 10 and partially covering the rear face of the foundation 10 as indicated at 14. The upholstery material 12 may be secured in any desired manner to the foundation or panel, as by pasting the portions 14 to the foundation 10.

Trim panels constructed as just described are adapted to permit the assembly of snap fasteners, having heads in the form of hooks, with respect thereto after the panels have been completely constructed by passing the portions of the hook-like heads through the openings 11 in the foundation 10 with which the fasteners are brought into interlocking engagement.

One form of fastener of the type that may be readily interlocked with respect to the panel after the covering material has been applied thereto, consists of a hook like head 15 and an expansible and contractible shank 16 extending approximately at right angles to the hook-like head 15. The fastener may be constructed of wire or sheet metal. That illustrated in the drawing is constructed of sheet metal, the hook head 15 consisting of a long arm 17, a shorter arm 18 and a connecting portion 19, preferably formed by bending a suitably shaped blank into the form of a hook consisting of the arms 17 and 18 and the connecting portion 19. The arms 17 and 18 are spaced apart by the portion 19 a sufficient distance so that said arms when applied to the foundation of the trim panel will firmly grip the opposite sides of the foundation. That is, the spacing between said arms is slightly less than the thickness of the foundation so that a firm non-slipping grip of the foundation between the arms is provided when the fastener is in its operative position.

The shank of the fastener is carried by the inner arm 18 of the head of the fastener, and consists of legs 20 and 21, the outer surfaces of which are bowed outwardly to provide divergently disposed holding surfaces 22 and 23 and convergently disposed guiding surfaces 24 and 25, which are arranged to engage the walls of the socket when the shank is entered therein to contract the shank of the fastener in a manner forming no part of the present invention. If desired, a wire fastener of the kind described in my application Serial No. 462,633, filed June 20th, 1930 may be used.

I have found that hook-on fasteners of the kind just described may be assembled with great expedition and facility through openings in the foundation of the panel that are substantially smaller than the area of the longer arm of the hook of the fastener by proceeding as illustrated in Figures 3, 4 and 5 of the drawing, by proceeding in the following manner:

The shank of the fastener is grasped by the operator and tilted so that the longer arm 17 thereof may be passed diagonally through the opening 11 and said arm is then passed through said opening. The diagonally opposite corners 26 and 27 of the opening 11 may be used to guide the fastener through the opening. Since both of said corners may serve as guides the operator can instantly bring the hook in proper position and move the fastener without loss of time from the full line to the dotted line position shown in Figure 3, such movement taking place in the direction of the arrow or at an acute angle to the surface of the foundation 10 of the panel. The operator having thus engaged the projecting end of the longer arm 17 of the fastener in back of the foundation 10, the fastener is next rotated, as shown in Figure 4 of the drawing, from the full line position in this figure to the position shown in dotted lines, the opening 11 being just large enough to permit the fastener to be freely thus rotated. After rotation of the fastener through the openings the arms 17 and 18 thereof are disposed parallel to the surfaces of the foundation 10 and the fastener may then be readily hooked upon the foundation by moving it in the direction of the length of the arms, from the full line position in Figure 5 to the dotted line position in said figure. The latter position represents the final position of the fastener with respect to the foundation.

It will be observed that even if for any reason the arms 17 and 18 do not firmly grip the foundation when the fastener reaches the dotted line position in Figure 5, and the fastener slips from this position toward the full line position in Figure 5, the fastener will not become disassembled because of the engagement of the connecting portion 19 thereof with the end 28 of the slot 11, the fastener being thus retained in interlocked relation with respect to the panels until readjustment thereof can take place in entering the shank of the fastener in the socket in the supporting structure.

The successive operations analyzed in Figures 3, 4 and 5 take place in rapid succession so as to constitute, in effect, a single continuous operation. Since the fastener is guided into position no time is lost in bringing about the desired assembly and the fasteners may be assembled with great expedition.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. The method of interlocking a snap fastener, having a head in the form of a hook the outer arm of which is longer than the inner arm thereof, to trim panels; which consists in forming an opening of insufficient length to permit the passage of the outer arm of the hook directly therethrough but approximating the length of the inner arm of the fastener, positioning the fastener so that the longer arm thereof extends angularly across said opening, moving said larger arm through said opening until the end of the inner arm abuts against a wall defining said opening, rocking said fastener about the point at which said arm contacts with said wall until the arms are approximately parallel with the surfaces of the panel, and then hooking the fastener on the panel by a substantially straight-line movement in the direction of the length of said arms.

2. The method of interlocking a snap fastener, having a head in the form of a hook the outer arm of which is longer than the inner arm thereof, to trim panels; which consists in forming an opening in the panel of insufficient length to permit the passage of the outer arm of the hook directly therethrough but approximating the length of the inner arm of the hook, positioning the fastener so that the longer arm thereof extends angularly across said opening, with portions thereof in guiding contact with diagonally opposite corners of the walls defining said opening, moving said arm through said opening until the inner end abuts against another corner of the wall defining said opening, rocking said fastener through said opening until the arms are approximately parallel with the surfaces of the panel, and then hooking the fastener on the panel by a substantially straight-line movement in the direction of the length of said arms.

BION C. PLACE.